United States Patent [19]
Crozier

[11] Patent Number: 5,553,385
[45] Date of Patent: Sep. 10, 1996

[54] HACKSAW WITH OFFSET BLADE

[76] Inventor: Daniel J. Crozier, 30 Martha Court, Welland, Ontario, Canada, L3C 4N2

[21] Appl. No.: 338,424

[22] Filed: Nov. 17, 1994

[51] Int. Cl.$^6$ .............. B27B 21/00; B27B 21/06
[52] U.S. Cl. .................. 30/508; 30/507; 30/518
[58] Field of Search .............. 30/509, 517, 519, 30/87–89, 508, 507, 518; 81/177.8; 16/111 A, 112

[56] References Cited

U.S. PATENT DOCUMENTS

| | | | |
|---|---|---|---|
| 747,735 | 12/1903 | Lawrence | 30/509 |
| 1,470,897 | 10/1923 | Voltz | 30/508 |
| 1,595,035 | 8/1926 | Troutman | 30/517 X |
| 1,822,428 | 9/1931 | Zilliox | 81/177.8 |
| 3,327,748 | 6/1967 | Reuterfors | 30/508 |
| 4,079,763 | 3/1978 | Riley | 30/519 X |
| 4,774,862 | 10/1988 | Scull | 81/177.8 |

Primary Examiner—Douglas D. Watts
Attorney, Agent, or Firm—Rogers & Scott

[57] ABSTRACT

The invention provides an improved frame for a hacksaw blade. The frame has a handle member and a frame member coupled together and defining a pair of aligned star shaped openings. Blade attaching components are releasably engaged in the respective openings for carrying a hacksaw blade. In the preferred embodiment the attaching components can be engaged in any one of eight angular positions, and the attaching components preferably includes curved portions to offset a hacksaw blade from the star shaped openings whereby the hacksaw can be used to cut through an item down to a supporting surface and also, with some adjustment to flush out an item projecting from a surface.

7 Claims, 3 Drawing Sheets

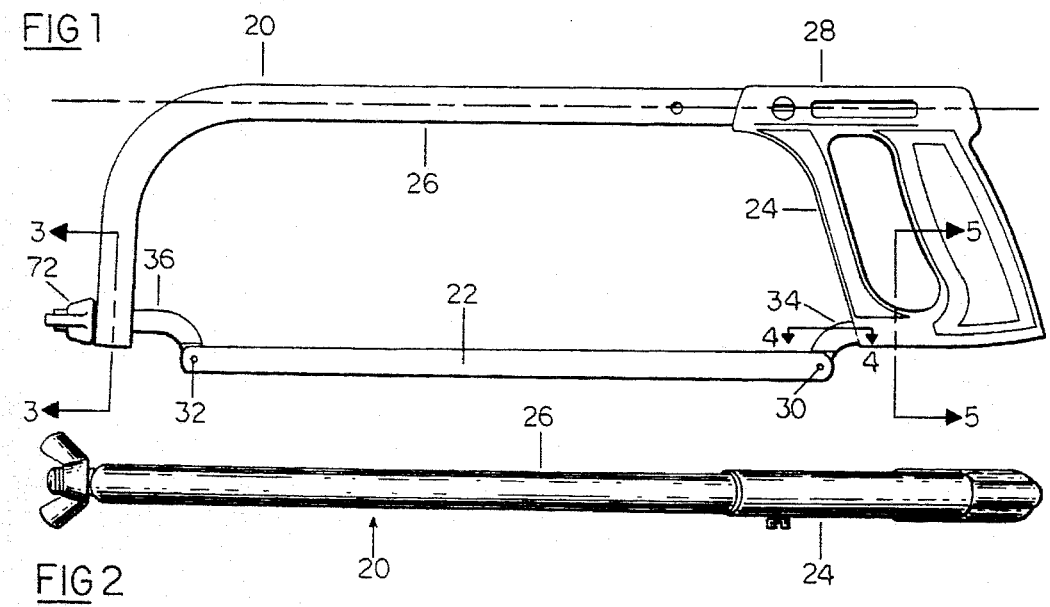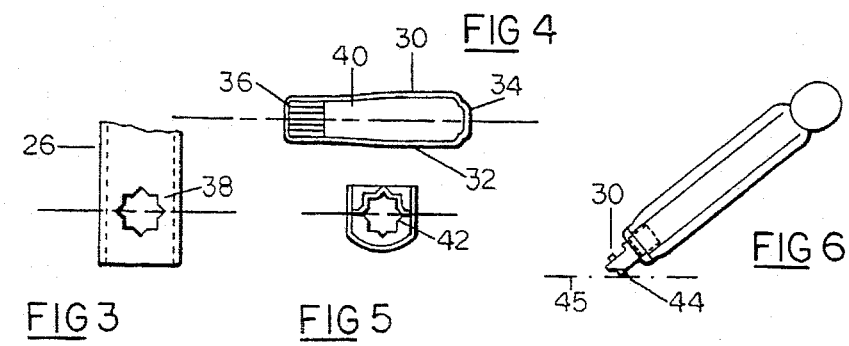

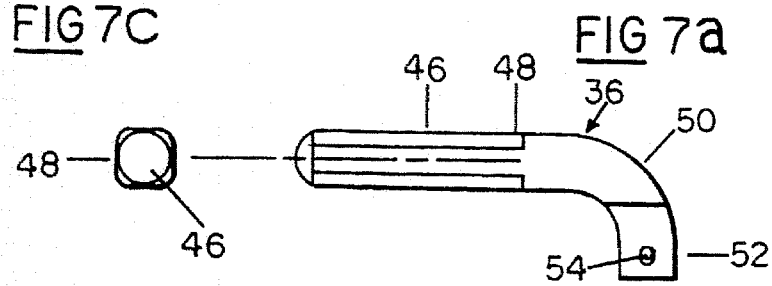
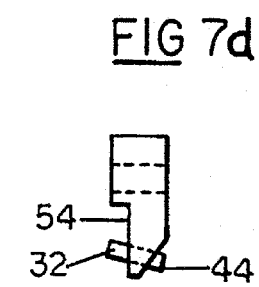
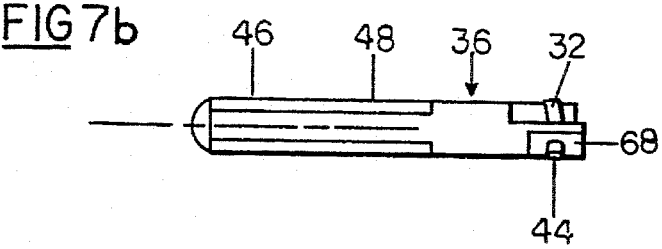
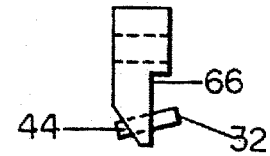
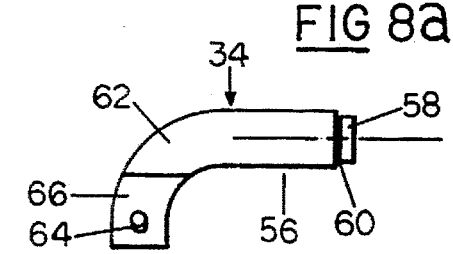
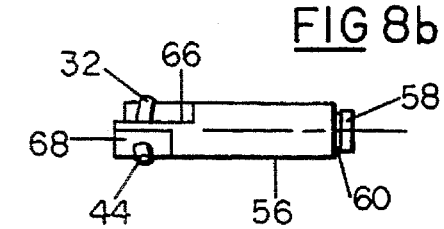

HACKSAW WITH OFFSET BLADE

FIELD OF THE INVENTION

This invention relates to a hacksaw frame for manual use and which provides for mounting a hacksaw blade in various orientations and locations with respect to the frame.

BACKGROUND OF THE INVENTION

Hacksaw frames have been developed to receive replaceable hacksaw blades. The blades conventionally have small openings, one at each end for engagement on pins forming part of the hacksaw frame. The frame can apply tension to the blade to positively locate the blade on the pins and to maintain the blade in a straight orientation during use.

There are a number of limitations to hacksaw frames. First of all, the blade is normally arranged so that it is impossible to cut through an object lying on a flat surface because the frame engages the surface before the blade is finished cutting. It is also difficult to cut an element projecting from a surface flush with that surface. This again is because the frame tends to interfere with the surface and force the user to cut the item proud of the surface rather than flush with it. Also, it is not convenient to use the hacksaw when the surface is larger than the hacksaw because the user's hand further forces the hacksaw away from the surface.

It is among the objects of this invention to provide an improved hacksaw frame which permits the user to perform cuts that were previously not readily done with prior art hacksaw frames.

SUMMARY OF THE INVENTION

The invention provides an improved frame for a hacksaw blade. The frame has a handle member and a frame member coupled together and defining a pair of aligned star shaped openings. Blade attaching components are releasably engaged in the respective openings for carrying a hacksaw blade. In the preferred embodiment the attaching components can be engaged in any one of eight angular positions, and the attaching components preferably includes curved portions to offset a hacksaw blade from the star shaped openings whereby the hacksaw can be used to cut through an item down to a supporting surface and also, with some adjustment to flush out an item projecting from a surface.

BRIEF DESCRIPTION OF THE DRAWINGS

FIG. 1 is a side view of a hacksaw frame according to a preferred embodiment of the invention and including a pair of blade attaching components and a hacksaw blade;

FIG. 2 is a top view of the hacksaw frame shown in FIG. 1;

FIG. 3 is a sectional view on line 3—3 of FIG. 1;

FIG. 4 is a sectional view on line 4—4 of FIG. 1;

FIG. 5 is a sectional view on line 5—5 of FIG. 1;

FIG. 6 illustrates an end view of the hacksaw frame with the blade arranged for flush cutting on a surface;

FIG. 7a is a side view of a blade attaching component shown to the left of FIG. 1;

FIG. 7b is a top view of the blade attaching component;

FIG. 7c is an end view of the component;

FIG. 7d is a view from the other end of the component;

FIGS. 8a, 8b, and 8c are views similar to FIGS. 7a, 7b, 7c and 7d and showing the blade attaching component to the right of FIG. 1;

FIG. 9 is a front view of a spring clip used to retain the component shown in FIG. 8a;

FIGS. 10a and 10b illustrate an alternative embodiment of the component shown in FIG. 7a;

DESCRIPTION OF THE PREFERRED EMBODIMENTS

Figure 10A:
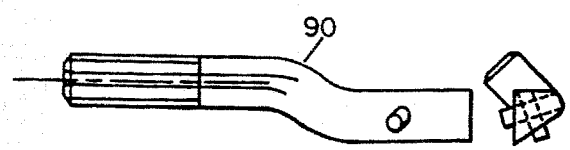

Reference is first made to FIG. 1 which illustrates a hacksaw frame indicated generally by the numeral 20 and carrying a conventional hacksaw blade 22. The frame consists of a handle member 24 connected to a tubular frame member 26 at a joint 28 which permits axial movement of the member 26 in relation to the member 24 to adjust for various lengths of hacksaw blade 22 as is conventional in the art.

The hacksaw blade 22 is supported on a pair of pins 30, 32 associated with respective blade attaching components 34, 36 which will be described more fully with reference to FIGS. 7 and 8.

Reference is next made to FIG. 3 which is a sectional view on line 3—3 of FIG. 1 and showing the section through an end portion of the frame member 26. It will be seen that there is a star shaped opening 38 formed in the member 26 and this opening extends axially parallel to the blade 22. The opening 38 is made up essentially of two squares offset one from the other by 45 degrees to give 8 points equally spaced.

At the other end of the frame 20, the attaching component 34 fits in the handle member 24 and FIGS. 4 and 5 illustrate sections of the handle member to show the shape in this part of the member. As seen in FIG. 4, the handle member is hollow with a downwardly extending aperture 40. An opening 42 seen in FIG. 5 is similar to opening 38 in the frame member 26 and is arranged to be in axial alignment with that opening. Because the opening 42 extends into the handle member 24, it terminates in the aperture 40 providing access to the opening 42 for reasons which will be explained. For the moment it is sufficient to understand that the attaching components 34, 36 fit in the respective openings 42, 38 and that adjustment in these openings is possible to change the orientation of the hacksaw blade 22.

Although it can not be seen in FIG. 1, the pins 30, 32 are complemented by a further pair of pins 44 (one of which can be seen in FIG. 6) for attaching the hacksaw blade to these pins and providing a different orientation. It will be seen in FIG. 6 that a surface 45 shown in ghost outline can be approached with the hacksaw blade on pins 44 without interference either from the hacksaw itself or the user's hand. It will be evident how this achieved with reference to FIGS. 7a through 8c which describe in more detail the blade attaching components 34, 36.

Reference is now made to FIG. 7a which illustrates the attaching component 36 in side view. The view 7b is from the bottom of FIG. 7a, view 7c is from the left end, and view 7d from the right end. As can be seen from these views, the attaching component 36 has a threaded end portion 46 which is round and which blends into a generally square portion 48. In turn, this portion blends into a curved portion 50 which forms a right angle and meets an end piece 52. This end piece is cut to form a recess 54 associated with the pin 32 for receiving the hacksaw blade 22 (FIG. 1). As can be seen in FIG. 7b, the single pin is deformed so that the pin 32 is formed from a single piece of material and also provides one of the pins 44. The angle of the pin is conventional so that the blade remains on the attaching component when the blade is tensioned.

FIG. 8a illustrates the attaching component 34 at the other end of the blade 22 (FIG. 1). This component has an end portion 56 separated from a collar 58 by a neck 60. At the other end, the end portion 56 meets a curved portion 62 which blends into an end piece 64. This end piece defines a recess 66 which in use is aligned with recess 54 (FIG. 7d) so that the blade 22, (FIG. 1) lies in both recesses in engagement with the respected pins 32, 30. As seen in FIG. 8b, the pin 32 is in fact a continuation of the same material forming one of the pins 44.

It will be seen in FIG. 7b and 8b that the pins 44 project through angled surfaces 68 which perform a similar function to the recesses 54, 66. However, when the blade is engaged on the pins 44 and engagement with the angled surfaces 68, the hacksaw can be used in the position shown in FIG. 6 where the blade is capable of flush cutting any projection through the surface 45 shown in ghost outline in FIG. 6.

The attaching components 34, 36 seen in FIG. 1 are held in place in two different ways. The component 34 is engaged in the opening 42 (FIG. 5) and held in place by a circlip 70 shown in FIG. 9. After the attaching component 34 has been engaged in the opening 42, the circlip can be engaged through the aperture 40 (FIG. 4) in the bottom of the handle and placed around the neck 60 (FIG. 8a) to retain the attaching component 34 in place. This component can be entered into the opening 42 (FIG. 5) in one of eight positions since the square cross-section of the end piece 56 will fit in the opening 42 in eight positions.

At the other end, the component 36 is engaged in the opening 38, (FIG. 3) to match the position of the component 34 and is held in place loosely at first by a wing nut 72 threaded on the end portion 46 (FIG. 7a) of the component 36. The hacksaw blade 22 is then engaged over the pins 30, 32 or the pins 44 whichever is required and the blade is tensioned in position using the wing nut to lock the blade in position in the frame 20. Clearly, the user has many options due to the possibility of placing the components 34, 36 in the frame in one of eight positions. Of course, if preferred, this embodiment could be modified by providing arrangements to accommodate more or less than eight positions.

Because the blade can be engaged in two positions on the attaching components 34, 36, there are in fact 16 possible positions for the embodiment described.

One of the advantages of the present structure is that the attaching components 34, 36 can be removed and different attaching components substituted. This improves the utility of the frame and many variations are possible. To demonstrate this, two further embodiments are shown in FIGS. 10a through 13b.

Figure 10B:

Reference is next made to FIGS. 10a and 10b. FIG. 10a includes an end view and it will be seen that an attaching structure similar to structure 36 provides a different arrangement of relationships but is nevertheless of similar structure to the attaching component 36. In particular, instead of having the curved portion 50 shown in FIG. 7a, there is an offset 90 which will have the effect of moving the hacksaw blade out of the confines of the frame and present the blade below the frame in somewhat similar fashion to FIG. 1 without as much offset. The complementary attaching component is shown in FIGS. 11a and 11b and it will be seen at a similar offset 92 is provided to match the offset 90 shown in FIG. 10a.

Figure 11A:
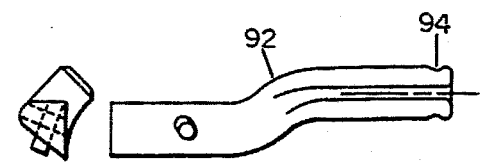
FIGS. 11a and 11b illustrate an alterative embodiment for the component shown in FIG. 8.
Figure 11B:
Figure 13A:
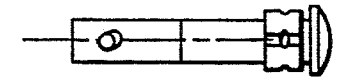
Figure 13B:
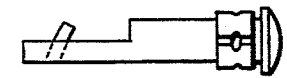

It will be appreciated that in FIGS. 10a and 11a, the offsets 90, 92 are shown in one plane and that the offset is actually a compound offset which can be seen in FIGS. 10b and 11b. As a result, the blade is both below the frame and drawn in FIG. 1 and the blade is positioned in alignment with the handle to give minimum torsional loading on the handle as the blade is pushed to cut an item.

As seen in FIGS. 11a and 11b, an opening 94 is provided and a pin can be engaged through this opening to retain the attaching component in the handle member 24 (FIG. 1) with access to the pin provided in the aperture 40 shown in FIG. 4. This is an alternative to the circlip used in previous embodiments and illustrated in FIG. 9.

Figure 12A:
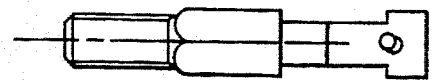
FIGS. 12a and 12b illustrate a further alternative embodiment for the component shown in FIG. 7 and FIGS. 13a and 13b illustrate a further alternative embodiment for the component shown in FIG. 8.
Figure 12B:

In some situations it may be preferable to use the hacksaw with the blade in a conventional arrangement. FIGS. 12a and 12b illustrate a suitable attaching component for the frame member and FIGS. 13a, 13b an attaching component for the handle member. In these cases, the blade would be held in alignment with the openings 38, 42 (FIGS. 3 and 5) provided in the frame.

These and other embodiments are within the scope of the invention and it is intended that such embodiments be included in the claims.

I claim:

1. A frame for a hacksaw, the frame comprising:

a handle member having a top and bottom and a downwardly opening aperture;

a frame member coupled to the handle member at the top of the handle member;

the handle member and the frame member defining respective first and second similar generally star shaped openings in alignment one with the other, the opening in the handle member extending into the member and terminating at said aperture;

a first and second blade attaching components having respective end portions shaped to fit in the star shaped openings in one of several possible angular orientations;

each of the blade attaching components including a pin to receive an end of a conventional hacksaw blade;

the first blade attaching component being releasably coupled to the handle member and projecting into said aperture to provide access to release the component; and the second blade attachment component being slidably engaged in the star shaped opening in the frame member and including a threaded adjuster to tension a hacksaw blade mounted in the frame.

2. A frame as claimed in claim 1 in which the star shaped openings have eight equally spaced points and the attaching component end portions are generally square in cross-section so that the attaching components can be engaged in any one of eight angular positions.

3. A frame as claimed in claim 2 in which the attaching components include curved portions between the respective end portions and the pins whereby the hacksaw blade can be assembled with the cutting edge clear of the frame for completely cutting through an object placed on a supporting surface.

4. A frame as claimed in claim 3 in which the attaching components further include aligned angled surfaces and a second pair of pins for receiving a hacksaw blade to cut projections off a supporting surface flush with that surface.

5. A frame for a hacksaw, the frame comprising:

a handle member;

a frame member coupled to the handle member;

the handle member and the frame member defining respective first and second similar generally star shaped openings in alignment one with the other;

a first and second blade attaching components having respective end portions shaped to fit in the star shaped openings in one of several possible angular orientations;

each of the blade attaching components including a pin to receive an end of a conventional hacksaw blade, and a curved portion between the respective pins and end portions to offset the pins from the end portions;

the first blade attaching component being releasably coupled to the handle member;

the second blade attachment component being slidably engaged in the star shaped opening in the frame member and including a threaded adjuster to tension a hacksaw blade mounted in the frame, whereby the hacksaw blade can be assembled with the cutting edge clear of the frame for completely cutting through an object placed on a supporting surface.

6. A frame as claimed in claim 5 in which the attaching components further include aligned angled surfaces and a second pair of pins for receiving a hacksaw blade to cut projections off a supporting surface flush with that surface.

7. A frame as claimed in claim 5 in which the star shaped openings have eight equally spaced points and the attaching component end portions are generally square in cross-section so that the attaching components can be engaged in any one of eight angular positions.

* * * * *